US008947740B1

(12) United States Patent
Wilsher et al.

(10) Patent No.: US 8,947,740 B1
(45) Date of Patent: Feb. 3, 2015

(54) METHOD AND APPARATUS FOR ADJUSTING LIGHT INTENSITY BASED ON CONTENT TO ACHIEVE A UNIFORM EXPOSURE

(71) Applicant: Xerox Corporation, Norwalk, CT (US)

(72) Inventors: Michael J. Wilsher, Letchworth Garden City (GB); Sebastián R. de Echaniz, Middleton (GB)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/181,989

(22) Filed: Feb. 17, 2014

(51) Int. Cl.
*H04N 1/407* (2006.01)
*H04N 1/29* (2006.01)
*H04N 1/036* (2006.01)
*G06K 15/14* (2006.01)
*B41J 2/45* (2006.01)
*H04N 1/40* (2006.01)
*H04N 1/028* (2006.01)

(52) U.S. Cl.
CPC ......... *H04N 1/40056* (2013.01); *H04N 1/0288* (2013.01)
USPC ......... 358/3.24; 358/3.26; 358/300; 347/130; 347/132; 347/237; 347/238

(58) Field of Classification Search
None
See application file for complete search history.

(56) References Cited

U.S. PATENT DOCUMENTS

| 6,686,946 | B2* | 2/2004 | Masuda et al. | 347/246 |
| 6,982,813 | B2* | 1/2006 | Hirata et al. | 358/1.9 |
| 2008/0292333 | A1* | 11/2008 | Yamazaki | 399/27 |
| 2012/0314014 | A1 | 12/2012 | Tewinkle | |

* cited by examiner

*Primary Examiner* — Scott A Rogers

(57) ABSTRACT

A method, non-transitory computer readable medium, and apparatus for adjusting a light intensity of a printhead are disclosed. For example, the method receives an image comprising a plurality of pixels, calculates a correction factor for each one of a plurality of pixels of the image by applying a filter to each one of the plurality of pixels of the image and summing a contribution of the light intensity of each one of a plurality of surrounding pixels to a pixel being analyzed to calculate an overlap value and comparing the overlap value to a development threshold range and adjusts the light intensity of a light source of the printhead in accordance with the correction factor of each one of the plurality of pixels of the image that require toner.

20 Claims, 5 Drawing Sheets

METHOD AND APPARATUS FOR ADJUSTING LIGHT INTENSITY BASED ON CONTENT TO ACHIEVE A UNIFORM EXPOSURE

The present disclosure relates generally to adjusting light intensity of a light source from a print head of a printer and, more particularly, to a method and an apparatus for adjusting light intensity based on content to achieve a uniform exposure.

BACKGROUND

Electro photography printer technology, e.g., a raster output scanner (ROS) that uses a light source such as a laser and a rotating polygon mirror, a light emitting diode (LED) printhead that uses LEDs as a light source, and the like, use the light source to charge a photoreceptor drum to indicate whether a pixel will receive toner. Some images may have areas that have a high density of pixels with a charge and other areas may have a low density of pixels with a charge. The areas with a high density of pixels will create an overlap of charge that may cause an over exposure of toner and create a toner pile.

One solution may be to reduce the overall light intensity for the image. This may reduce the over exposure of the areas with the high density of pixels with a charge. However, this may cause the areas with a low density of pixels with a charge to be under charged and not receive any toner. Thus, developing or printing images that have areas within the image with a large differential in charge is difficult using current printing technology and methods.

SUMMARY

According to aspects illustrated herein, there are provided a method, a non-transitory computer readable medium, and an apparatus for adjusting a light intensity of a printhead. One disclosed feature of the embodiments is a method that receives an image comprising a plurality of pixels, calculates a correction factor for each one of a plurality of pixels of the image by applying a filter to each one of the plurality of pixels of the image and summing a contribution of the light intensity of each one of a plurality of surrounding pixels to a pixel being analyzed to calculate an overlap value and comparing the overlap value to a development threshold range and adjusts the light intensity of a light source of the printhead in accordance with the correction factor of each one of the plurality of pixels of the image that require toner.

Another disclosed feature of the embodiments is a non-transitory computer-readable medium having stored thereon a plurality of instructions, the plurality of instructions including instructions which, when executed by a processor, cause the processor to perform an operation that receives an image comprising a plurality of pixels, calculates a correction factor for each one of a plurality of pixels of the image by applying a filter to each one of the plurality of pixels of the image and summing a contribution of the light intensity of each one of a plurality of surrounding pixels to a pixel being analyzed to calculate an overlap value and comparing the overlap value to a development threshold range and adjusts the light intensity of a light source of the printhead in accordance with the correction factor of each one of the plurality of pixels of the image that require toner.

Another disclosed feature of the embodiments is an apparatus comprising a processor and a computer readable medium storing a plurality of instructions which, when executed by the processor, cause the processor to perform an operation that receives an image comprising a plurality of pixels, calculates a correction factor for each one of a plurality of pixels of the image by applying a filter to each one of the plurality of pixels of the image and summing a contribution of the light intensity of each one of a plurality of surrounding pixels to a pixel being analyzed to calculate an overlap value and comparing the overlap value to a development threshold range and adjusts the light intensity of a light source of the printhead in accordance with the correction factor of each one of the plurality of pixels of the image that require toner.

BRIEF DESCRIPTION OF THE DRAWINGS

The teaching of the present disclosure can be readily understood by considering the following detailed description in conjunction with the accompanying drawings, in which:

FIG. 1 illustrates an example image of the present disclosure;

FIG. 2 illustrates an example filter of the present disclosure;

FIG. 3 illustrates an example image of the present disclosure with the overlap values calculated for each one of the pixels after the filter is applied to the image to calculate the correction factors;

To facilitate understanding, identical reference numerals have been used, where possible, to designate identical elements that are common to the figures.

DETAILED DESCRIPTION

Figure 4:
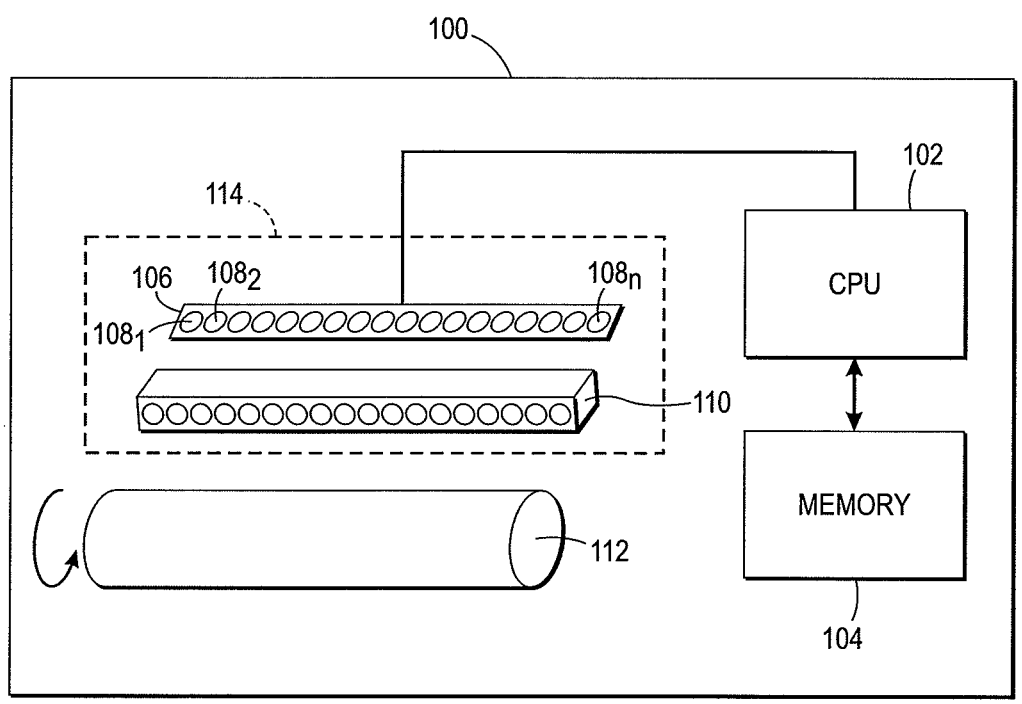
FIG. 4 illustrates an example block diagram of one example implementation of the present disclosure.

The present disclosure broadly discloses a method and non-transitory computer-readable medium for adjusting a light intensity of a printhead. As discussed above, some images may have areas that have a high density of pixels with a charge and other areas may have a low density of pixels with a charge. The areas with a high density of pixels will create an overlap of charge that may cause an over exposure of toner and create a toner pile.

If the overall power of the high density areas of the image is adjusted lower, then the power of a single pixel would also be reduced and fall below the development threshold. This would cause no toner to be added to the pixel. This relationship is fixed due to the spot shape and the spot spacing, assuming a fixed spot power. Thus, developing or printing images that have areas within the image with a large differential in charge is difficult using current printing technology and methods.

One embodiment of the present disclosure addresses this problem by adjusting a light intensity of each light source of a printhead that corresponds to a pixel of the image independently of one another in accordance with a correction factor that is obtained by mapping each pixel of the image. The map of the image may identify which pixels require having the light intensity reduced to prevent toner pile up and wasted toner and identify which pixels may require having the light intensity increased to ensure toner is applied to the appropriate pixels.

Figures 1, 2:
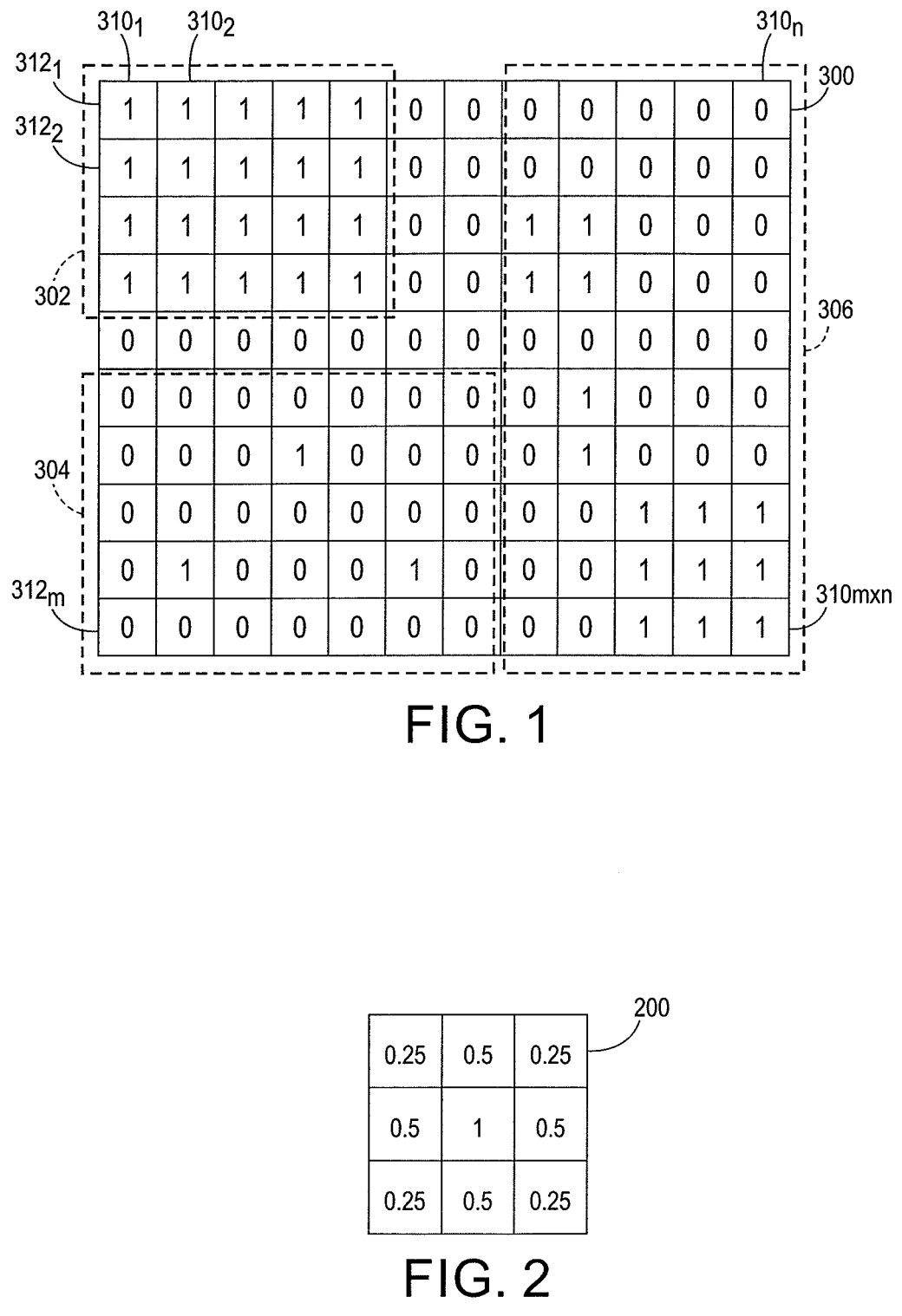

FIG. 1 illustrates an example image 300 that may be received to be developed or printed. In one embodiment, the image 300 may include a plurality of pixels or pixels $310_1$ to $310_n$ (also referred to as pixels 310) for each one of a plurality of rows $312_1$ to $312_m$ of the image 300. Thus, the image 300 may include a total of M×N pixels 310.

In one example, the image 300 may include a high density region 302, a dispersed or scattered region 304 and a partly clustered region 306. As discussed above, if each pixel 310 has at a development threshold, the light intensity profile of the high density region 302 may be much higher than the light intensity profile of the dispersed region 304. As a result, the high density region 304 may cause toner to pile up and have a non-linear relationship between spot density and development. If the overall power of the entire light source is decreased to try and compensate for the high density region 302, the pixels 310 in the dispersed region 302 may not receive enough power to generate enough charge to receive toner.

However, one embodiment of the present disclosure resolves this problem by applying a filter to the image 300 to calculate an overlap value of each one of the pixels 310 and calculate a correction factor for each one of the pixels. In one embodiment, the overlap value may be defined as a sum of the contribution of light by each one of the adjacent pixels based on the filter that is applied.

The overlap values may then be compared to a development threshold range or value to calculate a correction factor. In one embodiment, a development threshold range may be predefined. The development threshold range may be a range or value that determines whether or not a pixel 310 will receive toner.

In one embodiment, a pixel 310 having an overlap value that falls outside of the development threshold range or value may have a correction factor. The correction factor may be a function of how far off the overlap value is from the development threshold range or value. For example, if the development threshold value is approximately 2 and the overlap value of the pixel 310 is 1, the correction factor would be 2. In another example, if the development threshold value is approximately 2 and the overlap value of the pixel 310 is 4, then the correction factor would be 0.5. The correction factor may then be applied to the light source to determine how much of an adjustment is needed to the light source that corresponds to the pixel 310 that requires adjustment.

FIG. 2 illustrates one example of a filter 200 that can be applied to the image 300, the filter is representative of the spot power profile. In one embodiment, the filter 200 may be an N×N pixel block that calculates a contribution of neighboring pixels to the light intensity, and hence charge of an analyzed pixel. In one embodiment, the N×N matrix should be smaller than the dimensions of the image 300. The contributions of the neighboring pixels may be summed to calculate an overlap value for the analyzed pixel. The overlap values may then be compared to a development threshold range or value to calculate a correction factor for the analyzed pixel. In one embodiment, the filter 200 may be based upon a Gaussian distribution. However, it should be noted that the values of the filter 200 may be any value depending on a type of distribution or application that is desired.

Figure 3:
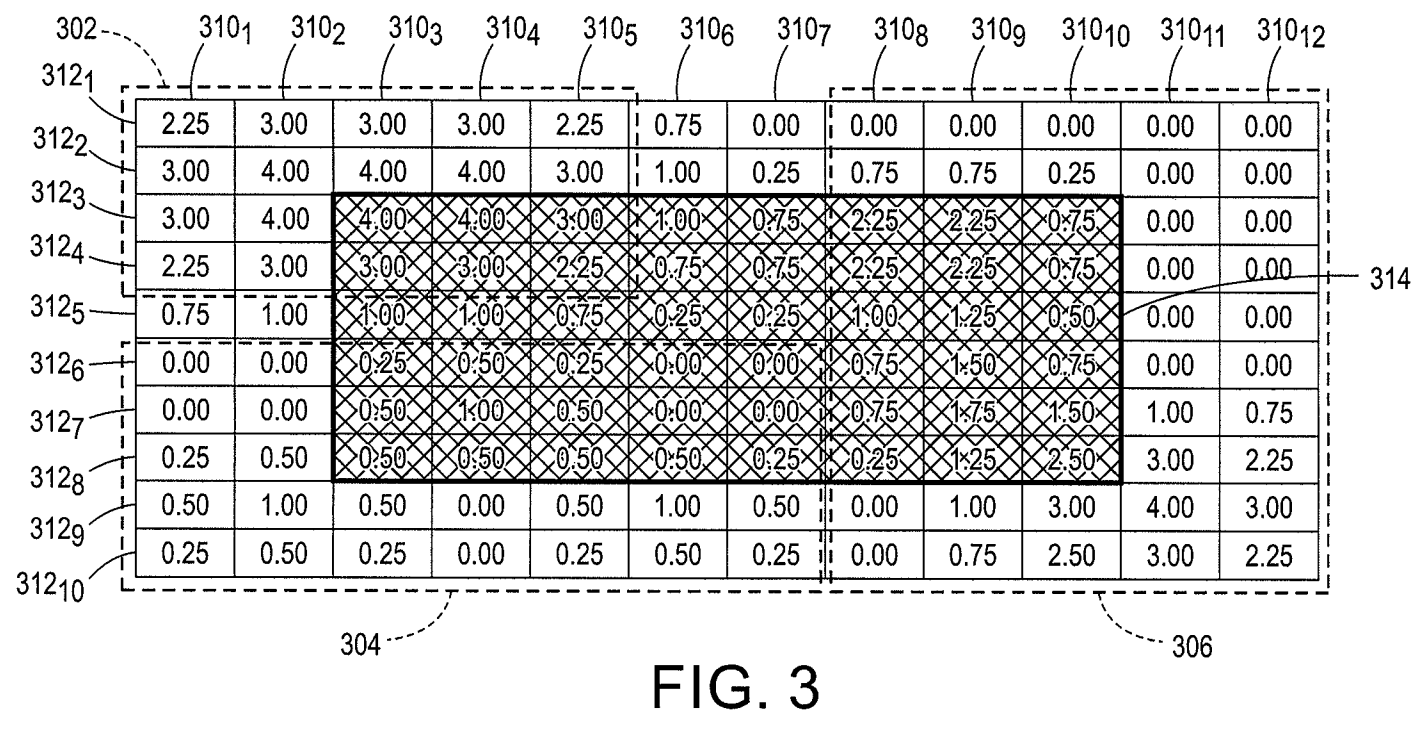

In one embodiment, the filter 200 may be applied to the image 300 to calculate a correction factor for each pixel 310 of the image 300, as described above. FIG. 3 illustrates one example of the overlap values calculated for the image 300, which can then be used to calculate the correction factors. In one embodiment, the image 300 may have ten rows and twelve columns. The image 300 may be analyzed in a line by line basis. It should be noted that the number of rows and columns are provided only as an example and that the image 300 may have any number of rows, columns and total number of pixels.

In one embodiment, only a center region 314 may be analyzed to determine the needed correction or adjustment of the light source of a printhead. The edge effects and edge interactions of the image 300 may be ignored to simplify the present example. In one embodiment, a development threshold range may be predefined. The development threshold range may be a range or value that determines whether or not a pixel 310 will receive toner. In the present example, the development threshold range may be defined as being between 1.75 and 2.25.

In FIG. 3, the pixels 310 may be referred to by row and column (e.g., pixel $310_{2,3}$ for the pixel row 2 and column 3) for the ease of describing the example. The pixels $310_{3,3}$, $310_{3,4}$, $310_{3,5}$, $310_{4,3}$, $310_{4,4}$ and $310_{4,5}$ that require toner (e.g., had a value of 1 in the image 300 of FIG. 1) may be in the high density region 302. Using the filter 200 that is a Gaussian filter, the overlap values for all the pixels except $310_{4,5}$ may be above the example development threshold range. Thus, the correction factor for the pixel $310_{3,3}$ may be calculated by comparing the overlap value of 4 to the development threshold range of 1.75-2.25 to calculate a correction factor of approximately 0.5. Thus, the light source that corresponds to the pixel $310_{3,3}$ would be adjusted or reduced by a correction factor of 0.5. The power delivered to the light source that correspond to the pixels $310_{3,3}$, $310_{3,4}$, $310_{3,5}$, $310_{4,3}$ and $310_{4,4}$ may be reduced by a respective correction factor to lower the light intensity for the corresponding light sources. As a result, the correction factor for each pixel $310_{3,3}$, $310_{3,4}$, $310_{3,5}$, $310_{4,3}$ and $310_{4,4}$ may be adjusted to fall within the example development threshold range.

Conversely, the pixel $310_{7,4}$ may require toner (e.g., had a value of 1 in the image 300 of FIG. 1) and may be in the dispersed region 304. The pixel $310_{7,4}$ may have an overlap value of 1 based on the application of the filter 200. The correction factor for the pixel $310_{7,4}$ may be calculated by comparing the overlap value of 1 to the development threshold range of 1.75-2.25 to calculate a correction factor of approximately 2.

Since the overlap value of 1 is below the example development threshold range, the pixel $310_{7,4}$ would previously not receive toner. However, the light source that corresponds to the pixel $310_{7,4}$ may have the power increased by a correction factor of 2 to increase the light intensity of the corresponding light source to move the overlap value to a value within the example development threshold range. As a result, the pixel $310_{7,4}$ would properly receive toner.

In the partly clustered region 306 most of the pixels $310_{3,8}$, $310_{3,9}$, $310_{4,8}$, $310_{4,9}$, $310_{6,9}$, $310_{7,9}$ and $310_{8,10}$ that may require toner (e.g., had a value of 1 in the image 300 of FIG. 1) may not require adjustment as the calibration factors are within the example development threshold range. For example, only the pixel $310_{6,9}$ may require an adjustment to increase the power of the corresponding light source to increase the correction factor to fall within the example development threshold range.

Thus, in one embodiment, the pixels 310 are identified as having an overlap factor that is above, below or within the development threshold range. Then a correction factor is calculated and an adjustment is made (e.g., reducing the power, increasing the power or maintaining the power delivered to one or more light sources, individually,) in accordance with the correction factor. As a result, regardless of whether a pixel 310 is within a high density region 302, a dispersed region 304 or a partly clustered region 306, all of the pixels 310 that require toner will have an approximately equal light intensity. This will prevent toner pile up and improve the linearity between spot density and development.

In one embodiment, not all of the light sources that correspond to a pixel 310 outside of the development threshold range may need to be adjusted. For example, in another embodiment, each time after a power delivered to a light source is adjusted, the correction factor for each one of the pixels 310 may be recalculated. The adjustment to the to the power delivered to the light source may change the overlap values of a neighboring pixel 310 such that another light source that corresponds to the neighboring pixel 310 may no longer need to be adjusted.

In one embodiment, the correction factors calculated from the mapping of a light intensity of each pixel 310 may be applied to adjust each light source individually for each pixel. One possible implementation of the above disclosed method is on a printer having an LED printhead.

FIG. 4 illustrates an example printer 100 having an LED printhead 114 of the present disclosure. In one embodiment, the printer 100 may include the LED printhead 114, a photoreceptor drum 112, a central processing unit (CPU) 102 and a memory 104. The memory 104 may be any type of computer readable storage medium to store information including, for example, data related to an image that is to be printed, predefined development threshold values or ranges, nominal LED calibration values, calibration factors for an image that is to printed, a filter that is applied to the image to calculate the calibration factors, and the like.

In one embodiment, the LED printhead 114 may include an LED board 106 having a plurality of LEDs $108_1$-$108_n$ (also referred to collectively as LEDs 108) and a lens array 110. In one embodiment, the LED board 106 may have more than one row of LEDs 108 and the lens array 110 may have corresponding rows of lens arrays.

In one embodiment, each one of the LEDs 108 may emit light that exposes the photoreceptor drum 112 as it rotates based upon data of an image that is to be printed. In one embodiment, each one of the LEDs 108 may be independently controlled by the CPU 102. The amount of current delivered to each one of the LEDs 108 may determine an amount of power delivered to each one of the LEDs 108. In turn, the amount of power may determine a light intensity of the LEDs 108 that determines an amount of charged exposed on the photoreceptor drum 112.

The light intensity of neighboring LEDs 108 both along the LED array and across line by line as the image is written may affect an exposure of the photoreceptor drum 112, thereby, causing high density portions of an image to have too much charge and receive too much toner causing a toner pile. However, as noted above, if the overall power is reduced for the entire row of LEDs 108, then scattered portions of the image may not have enough LED light intensity to charge the photoreceptor drum 112 enough and may not receive any toner when a pixel of the image is supposed to receive toner.

In one embodiment, the CPU 102 may independently control the LED light intensity of each one of the LEDs 108 based upon a value of a correction factor that is calculated as discussed above for each pixel 310 of an image 300. The correction factor control an adjustment of a power of each one of the LEDs 108 to determine whether the power should be decreased or increased to either reduce or increase, respectively, the LED light intensity to fall within the development threshold range. Thus, each pixel may receive an equivalent amount of toner irrespective of whether the pixel is in a high density region of the image or a dispersed region of the image.

In one embodiment, the printer 100 may be for halftone printing. In other words, each pixel of an image may either receive toner or not receive toner. As a result, the present disclosure is not attempting to adjust the visual intensity of an image, but rather adjusting the LED intensity of each individual LED 108 to affect the development and linearity of the reproduction or printing of the image.

In one embodiment, the printer 100 is a simplified block diagram for ease of explanation of the present disclosure. It should be noted that the printer 100 may include other components, such as for example, graphical user interfaces, mechanical rollers, trays, other electrical components, and the like, that are not shown in FIG. 4.

In one embodiment, the relationship between the correction factor and the amount of current or power delivered to the LED may be linear. For example, if the correction factor must be reduced by two times (2×) the current or power delivered to the LED 108 may be reduced by 2×. Conversely, if the correction factor must be increased by four times (4×), the current or power delivered to the LED 108 may be increased by 4×, and so forth.

In one embodiment, the correction factor for each pixel 310 of a line 312 may be sent to the LED printhead with the calibration factors of each one of the LEDs 108 serially between two consecutive lines of the image. In another embodiment, a double buffer may be used. The correction factor of each one of a current line 312 of pixels 310 of the image 300 may applied to the calibration factor of each one of the LEDs 108 to calculate a modified calibration factor for the LEDs 108 both calibrating the LEDs 108 and correcting the light output relative to the image content. The modified calibration factor may be written into a first buffer of the double buffer. Simultaneously, the calibration factor of a subsequent line 312 of pixels 310 of the image 300 may be read into a second buffer of the double buffer. This may be repeated for each line of the image. As a result, speed or efficiency of printing using the embodiments of the present disclosure may be increased.

In another embodiment, the correction factors may be applied to a traditional ROS system using a laser light source or any other light source. The correction factors may be applied to the laser light source to control an intensity of the laser light source for each pixel.

As a result, embodiments of the present disclosure adjust a light source for each pixel of an image based upon a calculated correction factor. The image may have a consistent light intensity for all pixels within all regions that require toner, whether the pixels are in a high density region, a dispersed region or a partly clustered region. This eliminates toner pile up and improves the linearity of the relationship between spot density and development. It should be noted that a perfectly uniform pixel charge is the target, however a significant reduction in the charge differential between single pixels and multiple pixels is also highly desirable and will significantly improve the operation of the system.

Figure 5:
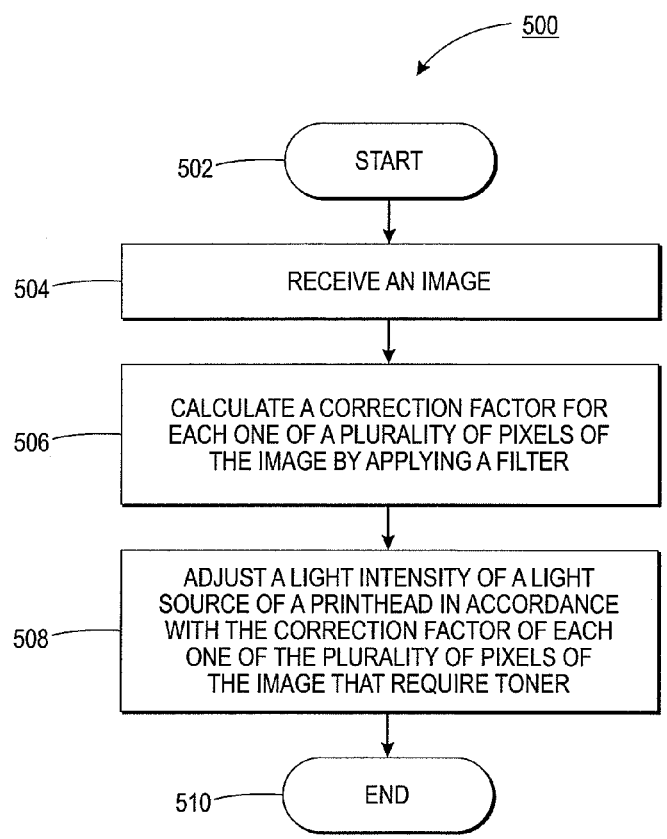
FIG. 5 illustrates an example flowchart of one embodiment of a method for adjusting a light intensity of a printhead.
Figure 6:
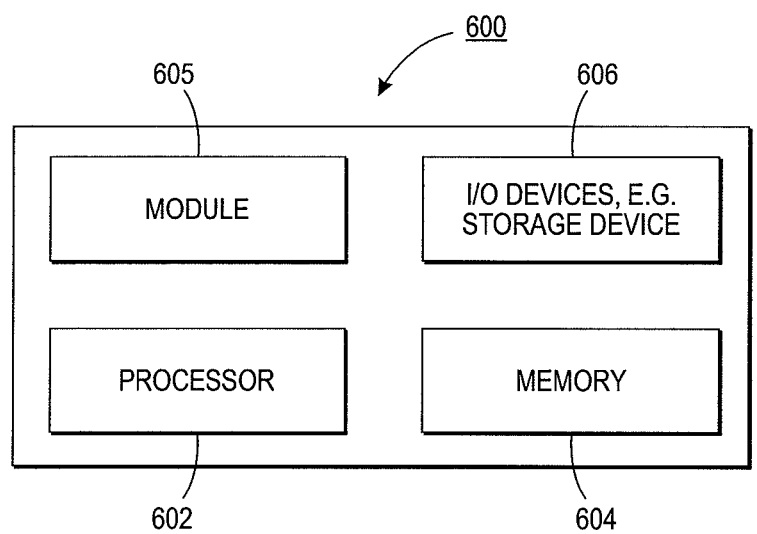
FIG. 6 illustrates a high-level block diagram of a general-purpose computer suitable for use in performing the functions described herein.

FIG. 5 illustrates a flowchart of a method 500 for adjusting a light intensity of a printhead. In one embodiment, one or more steps or operations of the method 500 may be performed by a printer (e.g., the printer 100 having an LED printhead) or a general-purpose computer as illustrated in FIG. 6 and discussed below.

At step 502 the method 500 begins. At step 504, the method 500 receives an image. In one embodiment, the image may be comprised of a plurality of lines, each line of the plurality of lines having a plurality of pixels. Each line of the plurality of pixels may correspond to a light source of a printhead (e.g., an array of LEDs of an LED printhead or a laser light source).

At step 506, the method 500 calculates a correction factor for each one of a plurality of pixels of the image by applying a filter. In one embodiment, the filter may be filter based upon a Gaussian distribution as illustrated by example in FIG. 2. The filter may be applied to each pixel of the image to calculate the calibration factor.

In one embodiment, the filter may be applied to calculate an overlap value for each pixel of the image. The overlap value may be a sum of the contribution of light by each one of the adjacent pixels based on the filter that is applied.

The overlap value of each one of the pixels may then be compared to a development threshold range or value to calculate a correction factor for each pixel. The development threshold range may be defined as a value or a range of values that is required to indicate to the printer whether toner should be applied to the pixel. A value below the development threshold range would indicate no toner will be applied and a value above the development threshold range would indicate that toner will be applied. In one embodiment, the development threshold range may be predefined by a user depending on various parameters including the type of printer, a desired image quality, and the like. For example, if the development threshold range is approximately 2, and a pixel has an overlap value of 1, the correction factor would be approximately 2. Conversely, if the pixel has an overlap value of 4, the correction factor would be approximately 0.5, and so forth.

At step 508, the method 500 adjusts a light intensity of one or more light sources of the printhead in accordance with the correction factor of each one of the plurality of pixels of the image that require toner. For example, if a printer using an LED printhead were used, the correction factors may be used to adjust power delivered to each one of the LEDs of the LED printhead.

For example, if the method 500 were implemented in a printer with an LED printhead, the correction factors may be provided to the LED printhead and each LED may be adjusted accordingly on a line by line basis until the entire image is processed. For example, the power delivered to an LED of the LED printhead that corresponds to the pixel in the current line being analyzed may be decreased by a correction factor if the overlap value was above the development threshold range. Conversely, the power delivered to an LED of the LED printhead that corresponds to the pixel in the current line being analyzed may be increased by a correction factor if the overlap value was below the development threshold range. If the overlap was within the development threshold range, no adjustment may be needed for the LED.

In one embodiment, only a subset of the LEDs may need to be adjusted. In other words, each LED that corresponds to a pixel that requires adjustment may not need to have its respective power adjusted to adjust the LED light intensity. For example, an adjustment of one LED may adjust the values of adjacent pixels enough to allow the pixels to fall within the development threshold range. In one embodiment, the step 506, in this illustrative algorithm may be repeatedly performed after each time the LED light intensity of an LED is adjusted to determine the effect of the adjustment on adjacent pixels. However, a reduction in the range is desirable. It is not necessarily required to completely correct the exposure level.

Although the example used in step 508 is discussed in reference to a printer with an LED printhead, it should be noted that adjustment may be performed on any type of light source for any type of printer (e.g., a printer with a laser light source, and the like).

Once all of the lines of the image are processed, the method 500 proceeds to step 510. At step 510, the method 500 ends.

It should be noted that although not explicitly specified, one or more steps, functions, or operations of the method 500 described above may include a storing, displaying and/or outputting step as required for a particular application. In other words, any data, records, fields, and/or intermediate results discussed in the methods can be stored, displayed, and/or outputted to another device as required for a particular application. Furthermore, steps, functions, or operations in FIG. 5 that recite a determining operation, or involve a decision, do not necessarily require that both branches of the determining operation be practiced. In other words, one of the branches of the determining operation can be deemed as an optional step.

FIG. 6 depicts a high-level block diagram of a general-purpose computer suitable for use in performing the functions described herein. As depicted in FIG. 6, the system 600 comprises one or more hardware processor elements 602 (e.g., a central processing unit (CPU), a microprocessor, or a multi-core processor), a memory 604, e.g., random access memory (RAM) and/or read only memory (ROM), a module 605 for adjusting a light intensity of a printhead, and various input/output devices 606 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the general-purpose computer may employ a plurality of processor elements. Furthermore, although only one general-purpose computer is shown in the figure, if the method(s) as discussed above is implemented in a distributed or parallel manner for a particular illustrative example, i.e., the steps of the above method(s) or the entire method(s) are implemented across multiple or parallel general-purpose computers, then the general-purpose computer of this figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed methods.

In one embodiment, instructions and data for the present module or process 605 for adjusting a light intensity of a printhead (e.g., a software program comprising computer-executable instructions) can be loaded into memory 604 and executed by hardware processor element 602 to implement the steps, functions or operations as discussed above in connection with the exemplary method 500. Furthermore, when a hardware processor executes instructions to perform "operations", this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 605 for adjusting a light intensity of a printhead (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for adjusting a light intensity of a printhead, comprising:
   receiving, by a processor, an image comprising a plurality of pixels;
   calculating, by the processor, a correction factor for each one of a plurality of pixels of the image by applying a filter to each one of the plurality of pixels of the image and summing a contribution of the light intensity of each one of a plurality of surrounding pixels to a pixel being analyzed to calculate an overlap value and comparing the overlap value to a development threshold range; and
   adjusting, by the processor, the light intensity of a light source of the printhead in accordance with the correction factor of each one of the plurality of pixels of the image that require toner.

2. The method of claim 1, wherein the filter comprises a Gaussian profile.

3. The method of claim 1, wherein the adjusting comprises:
   reducing, by the processor, a power delivered to the light source that correspond to the one or more pixels that have the overlap value above the development threshold range to reduce the light intensity of the light source that correspond to the one or more pixels.

4. The method of claim 1, wherein the adjusting comprises:
   increasing, by the processor, a power delivered to the light source that correspond to the one or more pixels that have the overlap value below the development threshold range to increase the light intensity of the light source that correspond to the one or more pixels.

5. The method of claim 1, wherein the adjusting comprises:
   maintaining, by the processor, a power delivered to the light source that correspond to the one or more pixels that have the overlap value within the development threshold range to maintain the light intensity the light source that correspond to the one or more pixels.

6. The method of claim 1, wherein the adjusting is performed on a line by line basis of the image.

7. The method of claim 1, wherein the light source comprises a plurality of LEDs on the printhead or a laser.

8. The method of claim 7, wherein the adjusting comprises adjusting the light intensity of each one of the LEDS of the printhead that correspond to a pixel of the plurality of pixels of the image that require an adjustment.

9. The method of claim 7, wherein the correction factor for each one of a line of pixels of the image is provided to the printhead with a calibration factor of each one of the plurality of LEDs of the printhead between two consecutive lines of the image.

10. The method of claim 7, wherein a calibration factor is adjusted with the correction factor for to calculate a modified calibration factor for a current line of pixels of the image that is written into a first buffer of a double buffer and the calibration factor of a subsequent line of pixels of the image is read into a second buffer of the double buffer.

11. A non-transitory computer-readable medium storing a plurality of instructions which, when executed by a processor, cause the processor to perform operations for adjusting a light intensity of a printhead, the operations comprising:
    receiving an image comprising a plurality of pixels;
    calculating a correction factor for each one of a plurality of pixels of the image by applying a filter to each one of the plurality of pixels of the image and summing a contribution of the light intensity of each one of a plurality of surrounding pixels to a pixel being analyzed to calculate an overlap value and comparing the overlap value to a development threshold range; and
    adjusting the light intensity of a light source of the printhead in accordance with the correction factor of each one of the plurality of pixels of the image that require toner.

12. The non-transitory computer-readable medium of claim 11, wherein the adjusting comprises:
    reducing, by the processor, a power delivered to the light source that correspond to the one or more pixels that have the overlap value above the development threshold range to reduce the light intensity of the light source that correspond to the one or more pixels.

13. The non-transitory computer-readable medium of claim 11, wherein the adjusting comprises:
    increasing, by the processor, a power delivered to the light source that correspond to the one or more pixels that have the overlap value below the development threshold range to increase the light intensity of the light source that correspond to the one or more pixels.

14. The non-transitory computer-readable medium of claim 11, wherein the adjusting comprises:
    maintaining, by the processor, a power delivered to the light source that correspond to the one or more pixels that have the overlap value within the development threshold range to maintain the light intensity the light source that correspond to the one or more pixels.

15. The non-transitory computer-readable medium of claim 11, wherein the adjusting is performed on a line by line basis of the image.

16. The non-transitory computer-readable medium of claim 11, wherein the light source comprises a plurality of LEDs on the printhead or a laser.

17. The non-transitory computer-readable medium of claim 16, wherein the adjusting comprises adjusting the light intensity of each one of the LEDS of the printhead that correspond to a pixel of the plurality of pixels of the image that require an adjustment.

18. The non-transitory computer-readable medium of claim 16, wherein the correction factor for each one of a line of pixels of the image is provided to the printhead with a calibration factor of each one of the plurality of LEDs of the printhead between two consecutive lines of the image.

19. The non-transitory computer-readable medium of claim 16, wherein a calibration factor is adjusted with the correction factor for to calculate a modified calibration factor for a current line of pixels of the image that is written into a first buffer of a double buffer and the calibration factor of a subsequent line of pixels of the image is read into a second buffer of the double buffer.

20. A method for adjusting a light intensity of a printhead, comprising:
- receiving, by a processor, an image comprising a plurality of lines, each one of the plurality of lines comprising a plurality of pixels, wherein each one of the plurality of pixels correspond to an LED of a plurality of LEDs of the LED printhead;
- calculating, by the processor, an overlap value for each one of a plurality of pixels of the image by applying a Gaussian filter to each one of all pixels of the image and summing a contribution of the light intensity of each one of a plurality of surrounding pixels to a pixel being analyzed;
- calculating, by the processor, a correction factor based on a comparison of the overlap value to a development threshold range;
- providing, by the processor, the correction factor for each one of the plurality of pixels of a current line of the plurality of lines to the LED printhead;
- adjusting, by the processor, a power of each one of one or more LEDs of the plurality of LEDs in accordance with the correction factor to adjust the light intensity of the each one of the one or more LEDs that correspond to a respective one of the plurality of pixels that require toner of the current line; and
- repeating, by the processor, the providing and the adjusting for each line of the plurality of lines of the image.

* * * * *